No. 716,038. Patented Dec. 16, 1902.
M. W. HIBBARD.
MECHANICAL MOVEMENT.
(Application filed Apr. 29, 1902.)
(No Model.)
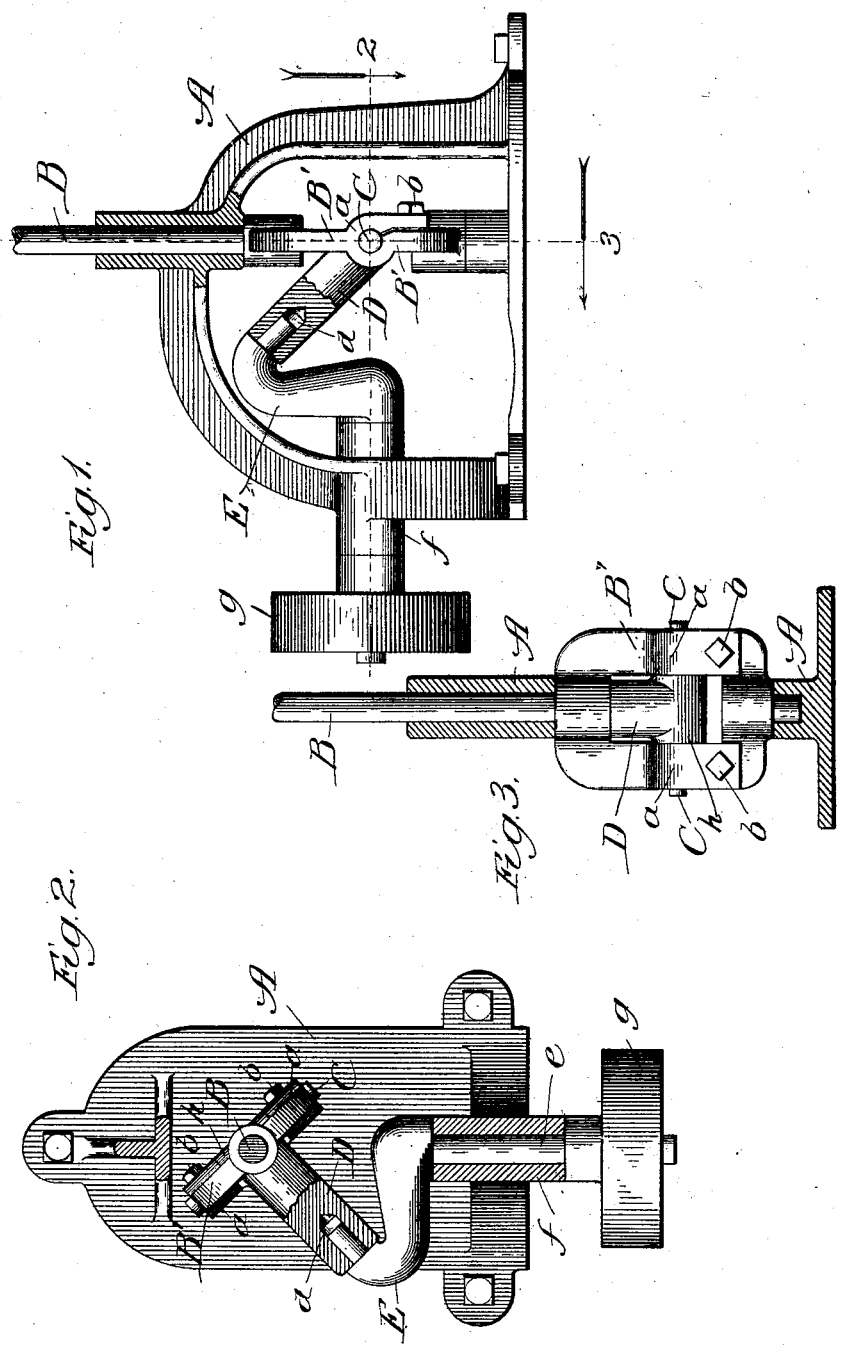

UNITED STATES PATENT OFFICE.

MAURY W. HIBBARD, OF CHICAGO, ILLINOIS, ASSIGNOR TO PETTIBONE, MULLIKEN & COMPANY, A CORPORATION OF ILLINOIS.

MECHANICAL MOVEMENT.

SPECIFICATION forming part of Letters Patent No. 716,038, dated December 16, 1902.

Application filed April 29, 1902. Serial No. 105,141. (No model.)

*To all whom it may concern:*

Be it known that I, MAURY W. HIBBARD, a citizen of the United States, residing at Chicago, in the county of Cook and State of Illinois, have invented a new and useful Improvement in Mechanical Movements, of which the following is a specification.

The object of my invention is to provide a new mechanical movement for converting the rotary action of a crank either continuously through a complete circle or oscillatingly in the arc of a circle into an oscillatory reciprocating motion for actuating power mechanism that is required to drive in a vibratory manner or turn back and forth upon its axis work-performing parts of machinery, such, by way of examples, as the reciprocating bed in a printing-press, the cutter-bar in a harvesting or analogous machine, a pump or other piston, or the spindle of a railway-switch stand.

Referring to the accompanying drawings, which illustrate my invention in its simplest and best form now known to me, Figure 1 is a view, in side elevation, partly in section, illustrating my invention. Fig. 2 is a plan section taken at the line 2 on Fig. 1 and viewed in the direction of the arrow; and Fig. 3 is a section taken at the line 3 on Fig. 1 and viewed in the direction of the arrow, but showing the crank in a horizontal position.

A is a frame or support of any suitable form or construction adapting it for the particular application of my novel mechanical movement to one or the other of the various purposes for which it is capable of use.

B is a member supported in bearings in the frame A to adapt it to be oscillated about its axis and shown as a vertical shaft carrying a yoke-frame B' at its lower end, the vertical arms of which are split below expanded sections or heads $a$, which are perforated transversely to afford bearings for a pin C, which projects at its opposite ends beyond the sides of the shaft and is releasably fastened against movement in its bearings by bolts $b$, serving to draw together the prongs of the split arms of the shaft, and thus clamp the heads about the pin to hold it firmly in place.

D is a link having a sleeve $h$ at one end, at which it loosely surrounds the pin C within the yoke B', whereby it is loosely journaled on the pin C. In the free end of the link D is formed a socket $d$ to receive loosely the end of a crank E, having a shaft-section $e$ journaled to rotate in a bearing $f$ in the frame A and carrying on its outer end a belt-pulley $g$ or other suitable operating means, including an operating-lever.

The device is operative as follows: Revolving the crank E by power applied to the pulley $g$ to rotate the shaft $e$ continuously in its bearing revolves the crank about the axis of the crank-shaft and imparts to the link D a compound motion while the end of the crank turns in the link-socket. This compound motion consists of a rotary motion of the link about the axis of the member B, which is turned part way around by the pulling and pushing strains of the yoke-arms, respectively, on opposite ends of the pin C, thus on opposite sides of the axis of the member B, and a motion of the link on its pivotal bearing at a right angle to the member B. Each half-revolution of the crank will therefore turn the member B part way around on its axis and the link D on its pivotal bearing to a downward-extending angle from its support, and completion of the revolution of the crank back to the position in which it is shown in Fig. 1 will turn back upon its axis the member B and the link D to their initial posititions illustrated. Thus the continuous revolution of the crank vibrates the link D and oscillates the member B on its axis.

The machinery to be actuated by the power exerted through my improved device may be connected in any suitable manner with the link D or with the member B, whichever shall be most desirable, though the primary purpose of the member B is to afford a bearing to the link which shall adapt it to undergo the necessary compound motion hereinbefore described.

If the power actuating the crank-shaft $e$ shall be applied to it in such a manner as to turn it back and forth through the arc of a circle, as through a half-circle, as may be done through the medium of ordinary clutch mechanism applied to the pulley or through the medium of a hand-lever on the end of the shaft, the downward motion of the link and the motion of the member B accompanying it will not be so far as under the action of the crank when revolved completely, but the vibration of the link and oscillation of the member B will obviously be the same, though within more restricted limits.

The construction shown in the drawings and thus minutely described may be variously altered in matters of detail without departure from my invention. I do not, therefore, limit my invention to such details, but intend it to include broadly any forms of the oscillatory member and crank, with their connecting-link so combined that the crank motion will vibrate the link at right angles to said member.

What I claim as new, and desire to secure by Letters Patent, is—

1. The combination of an oscillatory shaft, a link, a connection between the shaft and link permitting rocking movement of the latter, and a drive-crank having a crank-pin rotatably connected with the other end of the link, the pin being in alinement with the pivotal center of the other end of the link.

2. The combination of an oscillatory shaft carrying a yoke which is fixed thereto, a pivot-pin arranged transversely in the yoke, a link connected with the pin, and a drive-crank having a crank-pin rotatable in a socket in the other end of the link.

MAURY W. HIBBARD.

Witnesses:
ALBERT D. BACCI,
W. H. DYRENFORTH.